United States Patent [19]

Farmer et al.

[11] Patent Number: 5,331,412
[45] Date of Patent: Jul. 19, 1994

[54] TAMPER RESISTANT APPARATUS FOR A CATV SYSTEM

[75] Inventors: James O. Farmer, Lilburn; W. Brad Thatcher, Alpharetta, both of Ga.

[73] Assignee: Scientific-Atlanta, Inc., Atlanta, Ga.

[21] Appl. No.: 88,582

[22] Filed: Jul. 9, 1993

Related U.S. Application Data

[63] Continuation of Ser. No. 618,687, Nov. 27, 1990, abandoned.

[51] Int. Cl.⁵ .............................................. H04H 1/02
[52] U.S. Cl. .................................... 348/5.5; 455/4.2; 455/6.1
[58] Field of Search ....................... 358/86; 380/7, 10; 455/3.1, 4.1, 4.2, 5.1, 6.1, 6.2

[56] References Cited

U.S. PATENT DOCUMENTS

| 4,002,956 | 1/1977 | Minor et al. | 317/154 |
|---|---|---|---|
| 4,286,288 | 8/1981 | Waldo | 358/114 |
| 4,313,132 | 1/1982 | Doles et al. | 358/114 |
| 4,443,815 | 4/1984 | Hempell | 358/114 |
| 4,558,464 | 12/1985 | O'Brien, Jr. | 455/6.2 |
| 4,577,224 | 3/1986 | Ost | 358/114 |
| 4,673,976 | 6/1987 | Wreford-Howard | 358/86 |
| 4,716,588 | 12/1987 | Thompson et al. | 380/20 |
| 4,740,835 | 4/1988 | Nishibori et al. | 358/86 |
| 4,792,972 | 12/1988 | Cook, Jr. | 380/20 |
| 4,829,589 | 5/1989 | Uekusa | 358/86 |
| 4,837,820 | 6/1989 | Bellavia, Jr. | 380/7 |
| 4,912,760 | 3/1990 | West, Jr. et al. | 380/7 |
| 4,937,865 | 6/1990 | Barany | 380/7 |
| 4,963,966 | 10/1990 | Harney et al. | 358/349 |

Primary Examiner—Reinhard J. Eisenzopf
Assistant Examiner—Chi H. Pham
Attorney, Agent, or Firm—Banner, Birch, McKie & Beckett

[57] ABSTRACT

A circuit is supplied at the tap from a feeder which monitors certain signals coming from the single dwelling interdiction unit (SDI unit), and if the signals are interrupted, removes service from the premises. In order for service to be reinstituted to the subscriber DC power from the SDI unit must be received at the tap and the tap address must be communicated from memory in the SDI unit (where it had been previously stored upon installation by an installer) to the tap microprocessor. In accordance with an alternative embodiment in order for the service denial switch to remain closed, supplying signals to the SDI unit then to the home, the following must occur. Direct current power must be supplied from the SDI unit to the tap and data must be supplied from the SDI unit, in the form of pulses going from the normal powering level of, for example 12 volts, to 0 volts momentarily on a continual basis and not just at initialization as in the first embodiment. This data communicates a "keep alive" message to the tap, and may be changed from time to time. In accordance with another embodiment, AC power may be supplied by the SDI unit to the tap instead of DC power.

20 Claims, 4 Drawing Sheets

TAMPER RESISTANT APPARATUS FOR A CATV SYSTEM

This is a continuation of application Ser. No. 07/618,687 filed Nov. 27, 1990 now abandoned.

BACKGROUND OF THE INVENTION

1. Field of the Invention

The present invention relates to a tamper resistant apparatus for a CATV system which apparatus is connected between a trunk and an interdiction system or other program denial means such as negative traps which are located at a subscriber's home, whereby attempts to tamper with transmission of premium programs (in the clear) to the program denial means on the subscriber's home are detected and program denial is effected.

2. Background Description

FIG. 1 illustrates the problem with conventional interdiction systems or other program denial means, wherein signals are sent unscrambled (in the clear) along a trunk or feeder cable 10 to a pole mounted tap 12, down a drop cable 14 until they reach the program denial means 16, which may be located on the side of a home 18 for convenience and ease of access for the cable installer. The program denial means 16 is powered by cable 20 and grounded by cable 22 and supplies a scrambled signal along cable 24 to a subscriber's dwelling. However, when this is done, the signals come to the home 18 before being scrambled, resulting in additional opportunities for the subscriber to steal signals. For example, should the subscriber install a tap (available at popular electronics stores and home centers) before the program denial means 16, he or she will receive all signals regardless of whether he or she has purchased them.

In a simple situation such as the illustration of FIG. 1, the installation could be audited periodically to ascertain that the subscriber has not tapped in ahead of the interdiction device. However, in the more general cases, plants may be growing over the drop cable, rendering visual inspection difficult. In many areas today, the cable would be installed underground, rendering auditing impossible.

In order to accommodate a reasonable degree of security in such situations, it is desirable to have available some sort of security which will detect intervention by an unauthorized person, and will deny any signals under such conditions.

One system for detecting tampering in a CATV system is disclosed in U.S. Pat. No. 4,443,815. In this system a wired program distribution tamper detection circuit useful in CATV is connected in the subscriber drop cable between the trunk and a subscriber's TV set and cuts off the program signal in the event the cable is momentarily disconnected as would occur during tampering. The circuit detects an abnormal impedance, in its general form, or the interruption of a DC path through the cable, in its preferred embodiment, and inhibits the application of the signal upon such detection. A complaint by the subscriber thus effects an announcement of the tampering. Subsequently, a serviceman must be sent to the subscriber's home, and is able to reestablish service by the mere push of a button which is hidden within the connector housing.

In the tamper detection circuit disclosed in the above patent, a serviceman is required to be sent to a subscriber's home which can be costly and inconvenient. In addition, the tamper resistant circuit is not addressable from the headend.

SUMMARY OF THE INVENTION

It is the primary object of this invention to secure a subscriber's drop against unauthorized intrusion.

It is a further object to provide a simple yet secure means of simultaneously powering devices at the tap, and signalling to the tap device.

In accordance with the present invention a circuit is supplied at the tap which monitors certain signals coming from the single dwelling interdiction unit (SDI unit), and if the signals are interrupted, removes service from the premises. In order for service to be reinstituted to the subscriber DC power from the SDI unit must be received at the tap and the tap address must be communicated from memory in the SDI unit (where it had been previously stored upon installation by an installer) to the tap microprocessor.

In accordance with an alternative embodiment in order for the service denial switch to remain closed, supplying signals to the SDI unit then to the home, the following must occur. Direct current power must be supplied from the SDI unit to the tap as in the first embodiment and data must be supplied from the SDI unit, in the form of pulses going from the normal powering level of, for example 12 volts, to 0 volts momentarily on a continual basis and not just at initialization as in the first embodiment. This data communicates a "keep alive" message to the tap, and may be changed from time to time. As in the first embodiment, this "keep alive" data could also include data representing the address of the tap.

In accordance with another embodiment, AC power may be supplied by the SDI unit to the tap instead of DC power. The tap circuitry must be appropriately modified to accommodate this AC power.

The foregoing and other objects of the tamper resistant apparatus for a CATV system will be more fully understood and appreciated from the following detailed description of the preferred embodiment, which is presented by way of example rather than limitation, in conjunction with the drawings.

DETAILED DESCRIPTION OF THE PREFERRED EMBODIMENT

Figure 1:
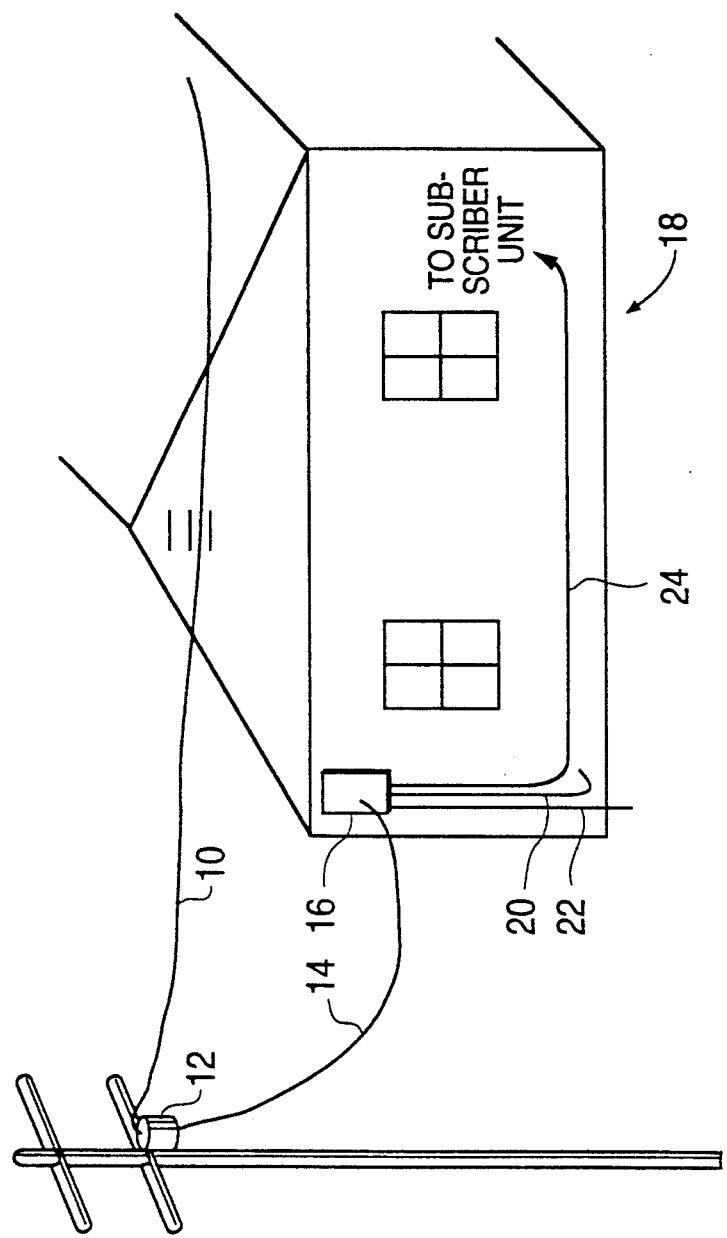
FIG. 1 is an illustration of a conventional CATV system wherein signals arrive at a subscriber's house in the clear and are selectively denied by a program denial means.
Figure 2:
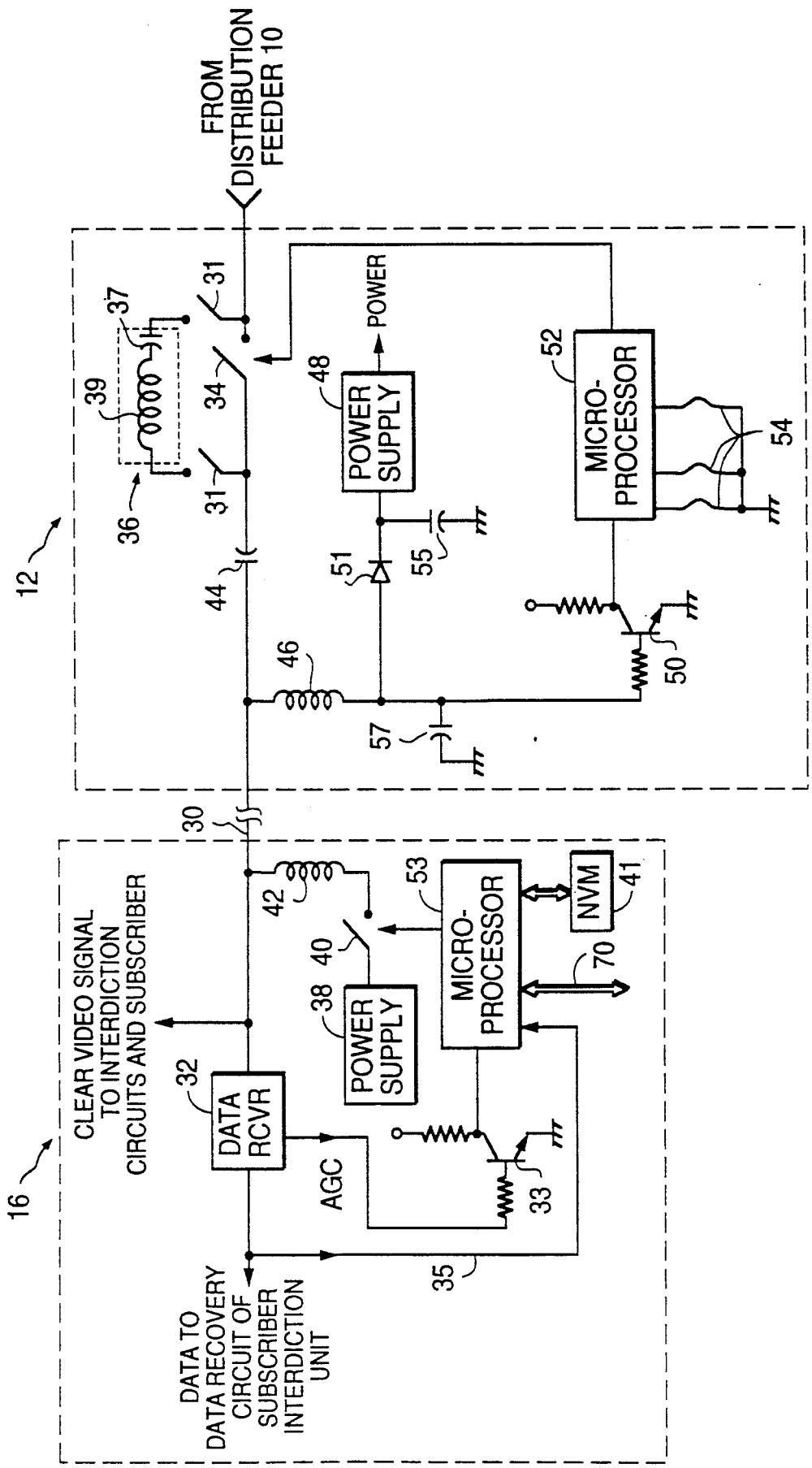
FIG. 2 is a schematic of the preferred embodiment of the present invention which includes a switch in the tap for denying programming to a subscriber upon detection of tampering.

Referring now to the drawings, FIG. 2 is a schematic of the preferred embodiment of the present invention wherein the single dwelling interdiction unit ("SDI" unit) 16, preferably located on the side of the house 18 as shown in FIG. 1, is partially shown connected by drop cable 30 to an intelligent tap 12 containing the denial circuitry. Contained within the SDI unit 16 is a data receiver 32, which is used to allow communications from the headend, for example, via a 108 MHz data carrier. The data receiver 32 data output is supplied to a data recovery circuit not shown. The data recovery circuit for receiving so-called "out-of-band" data is conventionally known from conventional Scientific-Atlanta set top terminal apparatus such as the Model 8580. The data recovery circuit is disclosed in U.S. Pat. No. 4,912,760 in FIG. 2 which patent is herein incorporated by reference. The RF signals bearing television information are supplied to the actual interdiction circuits and then to the subscriber, in another block of circuitry not shown (See FIG. 3, the subscriber module of U.S. Pat. No. 4,912,760). Although the '760 patent discloses separate microprocessors 260 and 300 in FIGS. 2 and 3 respectively, the control circuitry of these microprocessors would be combined into microprocessor 53 in the present invention. The only output of the data receiver 32 which is shown is the AGC voltage, which is taken to be positive when receiving a data signal, and close to 0 when a data signal is not present. The utility of this configuration will be described below in the address transfer operation during installation. The AGC output of the data receiver 32 is supplied to a microprocessor by way of buffer transistor 33. It is important to note that while the discussions here generally relate to single dwelling interdiction unit as with SDI unit 16, other program denial means such as negative traps may be used.

At the intelligent tap 12 is shown relay 34 used to interrupt signals going to the SDI unit 16. A 108 MHz data carrier bypass 36 is provided which contains a capacitor 37 and inductor 39 to provide the appropriate frequency of the data carrier to be bypassed. This allows the data carrier which services the SDI unit 16 to be coupled through to the SDI unit 16. A variety of frequencies could be used to communicate with the SDI unit. The frequency used would be the one bypassed.

Power is supplied to the tap 12 from the SDI power supply 38, through switch 40 and RF choke 42. Capacitor 44 blocks power from going to the distribution system. RF choke 46 couples power to the tap power supply 48 and to a data recovery transistor 50. A microprocessor 52, such as a Motorola 6805 series, in the tap provides the intelligence required to operate the system. Programming jumpers 54 are used to provide a semi-unique address for the tap. Other methods may be used to provide this address, such as a nonvolatile memory or a series of switches, e.g. DIP switches that were previously set. It could also be a PROM that was programmed at the factory.

A unique address may also be provided if desired. With a unique address you are guaranteed that the address is not duplicated anywhere in the CATV system at other subscriber taps. With a semi-unique address the address may be duplicated in the CATV system; however, the probability of having two duplicate addresses next to each other is very small. A semi-unique address is proposed in the preferred embodiment because there does not seem to be a serious compromise in security and it is much simpler than the unique address. The operation of the system will now be explained by way of example.

Upon installation, the tap is configured to not pass signals by virtue of relay 34 being open. When the system is installed, the installer should not be required to have knowledge of the address of the particular tap, the taps typically being installed in advance of installation of the remainder of the system. A service or expansion connector 70 is provided on the SDI microprocessor, at which the installer connects a simple installation unit (Not shown) The installation unit is a special purpose microcomputer which is carried by the installer. This installation unit sends a unique code to microprocessor 53, which intitiates a sequence in which microprocessor 53 learns the semi-unique address of the tap 12 as determined by jumpers 54. This address is learned by sending a signal to the tap microprocessor 52, which causes it to transmit this information to the SDI unit 16. During factory construction of the tap 12, a random assortment of jumpers 54 are installed, giving taps different addresses. This is needed in order to prevent one neighbor from accessing someone else's tap. The tap 12 transmits its address to the SDI unit 16, which stores this information in its non volatile memory 41, or in other suitable permanent storage means.

After the installer removes the installation unit connected to the connector 70, the tap address stored in non volatile memory 41 cannot be changed.

After installation, SDI microprocessor 53 provides power to the tap unit 12 by closing switch 40, following which it transmits back to microprocessor 52 the tap address stored previously. Upon successful receipt by microprocessor 52 of its tap address and possibly an additional enabling command, tap microprocessor 52 closes switch 34, allowing signals from the distribution trunk 10 to pass to the SDI unit 16. This process must occur each time power is supplied to the SDI unit 16, as the main power supply can fail, requiring re-initialization of the tap. In an alternative embodiment, digital data, a tap address for example, is periodically communicated to the tap 12 such that the receipt of the transmitted signals will be received by a subscriber only upon receipt of the digital data by the tap 12.

Power is supplied to the tap 12 by supplying direct current (alternating current can also be used as described below in an alternative embodiment) from SDI supply 38 through switch 40 and RF choke 42. It is recovered at the tap 12 through RF choke 46 and diode 51, and stored on capacitor 55. Capacitor 57 provides RF bypassing for any RF which gets beyond RF choke 46.

Data communications to the tap 12 is provided by momentarily removing power, from power supply 38, by opening switch 40 under control of microprocessor 53. Power can be removed only for a short period of time, as capacitor 55 must store enough charge to allow the tap 12 to be powered during the interruption. Normally, transistor 50 in the tap is saturated by virtue of the power coming through RF choke 46. However, when the power is removed momentarily from the tap by opening switch 40, transistor 50 is turned off. Those skilled in the art know that the output of transistor 50, supplied as input to microprocessor 52, will be at 0 volts normally, and will go to approximately 5 volts when the power is interrupted. By supplying a series of pulses at the output of transistor 50, information, such as th address contained in NVM 41 can be communicated to microprocessor 52 and compared to the address determined by the jumpers 54. These pulses are generated by SDI microprocessor 53, which toggles switch 40 to place the pulses on the drop cable 30.

Figure 3:
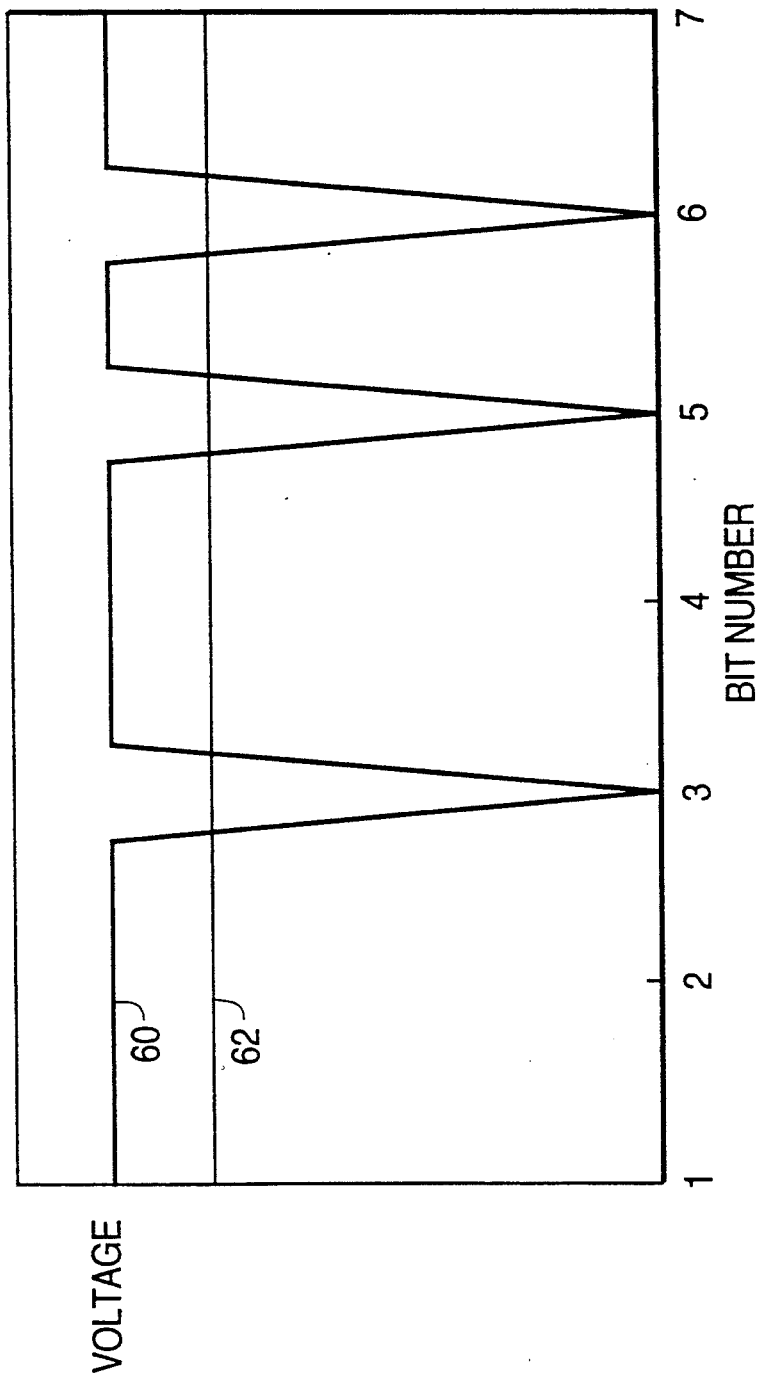
FIG. 3 is a graphical illustration of the manner of transmitting power and data to the tap by control of the power supply of the SDI unit.

FIG. 3 illustrates data transmission by way of power removal according to the present invention. The voltage 60 on the drop cable, is found on cable 30 (FIG. 2). Normally voltage 60 is maintained at the positive potential desired (for example, 12 volts, though it is not intended to limit it to this value). Data bits are transmitted at the times marked 1 through 7. According to the present example, data bits 1, 2, 4 and 7 are logic 0, represented by the voltage not momentarily dropping, i.e. closed switch 40. Data bits 3, 5 and 6 are logic 1, represented by the voltage dropping momentarily, i.e. opened switch 40. At the tap, power is separated from data as follows. Power is supplied through diode 51, which charges capacitor 55. During the momentary removal of power for data transmission, capacitor 55 retains a charge, providing the power to the power supply 48. Diode 51 is back biased during this time and does not allow charge on the capacitor 55 to leak back into the drop 30. The voltage 62 to the power supply does not drop when the voltage drops on the drop cable, due to capacitor 55. Power supply 48 supplies power to microprocessor 52 and other devices that need power in the tap 12.

Transistor 50 is normally saturated, providing a low logic level to microprocessor 52. During the momentary power interruptions used for transmitting data, transistor 50 comes out of saturation and provides a high logic level to the microprocessor 52. Thus, simultaneous data transmission and powering through the drop cable 30 is accomplished.

A method of communicating from the tap 12 back to the SDI unit 16 is now described. This is needed in order to allow the tap 12 to transmit its address, determined by the jumpers 54, to the SDI microprocessor 53. This transmission is most easily accomplished by using the disconnect switch 34, controlled by microprocessor 52 to momentarily remove signals from the drop during the initial set-up step. A signal is momentarily removed, and thus the AGC output of data receiver 32 is caused to go to approximately 0 volts (any unique voltage level could be used; 0 volts is convenient to detect but the invention is not intended to be limited to this value). By removing signals in a fixed pattern, data may be transmitted from the tap 12 to the SDI unit 16 in this manner. The advantage of this method is that no additional circuitry is needed for data transmission, i.e. the tap address. Transmission is slow, but needs to occur only upon initial installation or servicing of the SDI unit 16, and so does not have to occur rapidly. When data (address data) is being communicated to the microprocessor 53, the data carrier bypass 36 must be uncoupled. Thus, additional switches 31 are provided to uncouple the bypass 36 under control of microprocessor 52. The switches 36 are separate from switch 34 because there are times when it is necessary to open switch 34 alone and allow data to pass through data bypass 12 to the SDI unit 16. The control line from microprocessor 52 to switches 37 is not shown.

Figure 4:
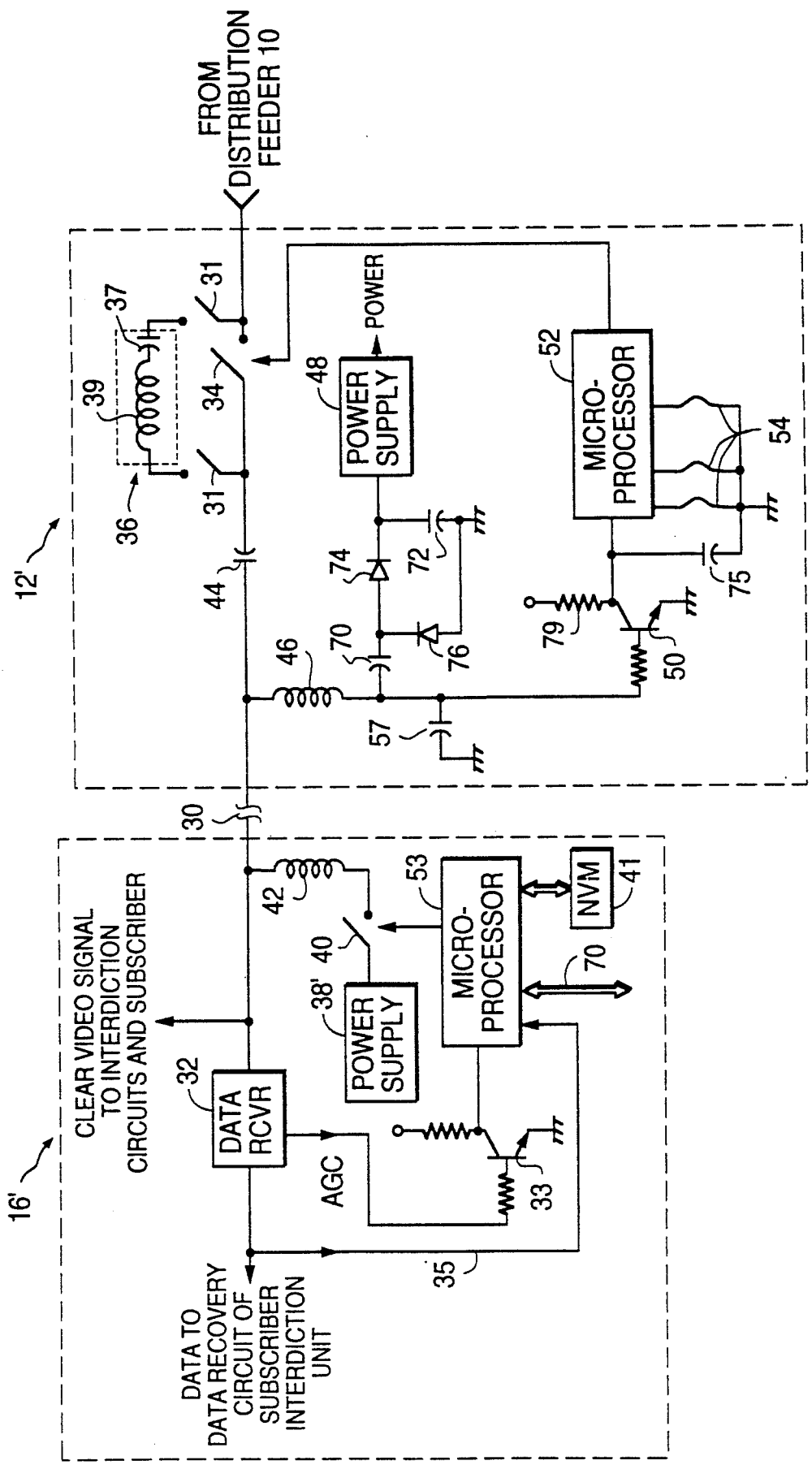
FIG. 4 is an alternative embodiment of the present invention wherein AC power is supplied from the power supply of the SDI unit.

When service is disconnected by opening of switch 34, the data carrier bypass switches 31 are maintained closed to allow control data to be communicated to the SDI unit 16 from the headend. When the subscriber calls the headend and reports loss of service a signal is sent from the headend to microprocessor 53 in the SDI unit 16 which subsequently sends a signal to microprocessor 52 at the tap 12 to cause the switch 34 to be closed such that program service is again received. Thus the tap 12 doesn't receive signals directly from the headend. It can be indirectly controlled from the headend through the path used for sending addressable data down the 108 MHz data carrier bypass 36. The microprocessor 53 processes the data and sends the appropriate commands back up the drop 30 to the tap microprocessor 52. Line 35 in FIGS. 2 and 4 is utilized for the purpose of communicating data from the headend to microprocessor 53 in the SDI unit to thereby communicate with microprocessor 52 at the tap.

Transmission of DC power to the tap was described above with reference to FIG. 2. However, transmission of power to the tap using alternating current is often desirable. Use of alternating current will minimize corrosion problems which may occur with DC transmission. The same method of data transmission may be employed with the minor modifications shown in FIG. 4. In order to allow true alternating current transmission, a voltage doubler circuit is employed at the tap 12'. This voltage doubler allows for a higher voltage level and ensures true transmission of alternating current. The configuration shown is one of several known to those skilled in the art, and consists of capacitors 70 and 72, and diodes 74 and 76. When the voltage appearing at RF choke 46 is negative, current is pulled through diode 76, charging capacitor 70 such that the right end is positive with respect to the left end. When the voltage goes positive, diode 76 is reverse biased and diode 74 is forward biased, transferring the peak to peak voltage to capacitor 72.

The other change required to accommodate alternating current transmission is the addition of capacitor 75. Normally when a logic 1 is not being transmitted, an alternating voltage will appear at the base of transistor 50. When the voltage is positive, the transistor will be saturated and the voltage at its collector will be 0 volts as in the direct current case above. However, on alternative half cycles of the alternating voltage, the transistor will be turned off and the collector voltage will rise, indicating a logic 1. In order to prevent this, capacitor 75 is added to the collector. Its value is chosen so as to prevent excessive rise of the collector voltage during negative half cycles of the power. During power interruptions of several cycles, indicating transmission of a logic 1, the capacitor 75 charges through resistor 79 at the collector of transistor 50, transmitting the logic 1 to microprocessor 52.

The foregoing has described a tamper resistant apparatus for a CATV system which is used to thwart a would-be pirate by removing signals transmitted to the SDI unit 16 if it detects tampering with the drop 30. Such tampering would necessitate removal of power from the tap 12 during the tampering incident. When power is removed from the drop 30, service interruption switch 34 removes signals from the drop 30. When power is restored, microprocessor 52 will not re-close switch 34 until it receives its address from the SDI unit microprocessor 53. Of necessity, the tampering will take place between the SDI unit 16 and the tap 12, there being no authorized signals available after the SDI unit 16 and physical access being difficult and subject to discovery before the tap 12. In order to accommodate immediate recovery after a normal power drop, microprocessor 53 automatically transmits authorization data to the tap upon restoration of power. The authorization consists of the tap's semi-unique address determined in the example by insertion of a random pattern of jumper wires 54 in the tap during manufacture.

The tap address is known to the SDI unit by virtue of an installation step in which the installer uses a portable device which is connected to the service or expansion connector of the SDI unit. This device causes the microprocessor 53 to query the tap microprocessor 52. Microprocessor 52 then transmits back its semi-unique address. The address is stored in non volatile memory 41. Unique addresses may be used if desired, though at a penalty of cost to store the unique address. The present system is addressable and low cost because it takes advantage of addressable circuitry already existing in the SDI unit on the side of a subscriber's house. From the headend, you can communicate indirectly with the addressable tap without the need for a separate high quality data receiver in the tap by utilizing the existing receiver in the SDI unit. The present invention also offers the advantage of its semi-unique address and the manner of communicating this address to the SDI unit in an inexpensive manner as disclosed.

Whereas the preferred form of the invention has been shown and described herein, it should be realized that there may be many modifications, substitutions and alterations thereto.

We claim:

1. A method for preventing the unauthorized reception of signals in a CATV system comprising the following steps:
   sending power and a previously programmed address to a tap via a drop cable, said previously programmed address being stored in a programmable program security device;
   receiving at said tap, said power and said previously programmed address;
   comparing said previously programmed address against a tap address maintained in said tap; and
   allowing said signals to be transmitted to said programmable program security device when said previously programmed address and said tap address are determined to be the same during said comparing step.

2. The method as in claim 1, wherein said sending step further comprises the step of alternately connecting and disconnecting said power from said drop cable to send said previously programmed address to said tap.

3. The method as in claim 2, wherein said receiving step further comprises the step of temporarily storing said power at said tap to drive said tap during periods when said power is disconnected from said drop cable.

4. The method as in claim 1, wherein said allowing step further comprises the step of disallowing said signals from being transmitted to said programmable program security device when said previously programmed address and said tap address are determined to be different during said comparing step.

5. An apparatus for preventing the unauthorized reception of television signals in a CATV system comprising:
   sending means for sending power and a previously programmed address to a tap via a drop cable, said previously programmed address being stored in a programmable program security device;
   receiving means for receiving, at said tap, said power and said previously programmed address;
   comparing means for comparing, at said tap, said previously programmed address against a tap address maintained in said tap; and
   allowing means, responsive to said comparing means, for allowing, at said tap, said television signals to be transmitted to said programmable program security device when said previously programmed address and said tap address are determined to be the same by said comparing means.

6. The apparatus as in claim 5, wherein said sending means comprises a microprocessor, and said previously programmed address is stored in a nonvolatile memory coupled to said microprocessor.

7. The apparatus as in claim 5, wherein said comparing means comprises a microprocessor, and said tap address is maintained by wiring jumpers coupled to said microprocessor.

8. The apparatus as in claim 5, wherein said sending means sends said previously programmed address at periodic intervals to said tap.

9. The apparatus as in claim 6, wherein said sending means sends said previously programmed address by intermittently interrupting and reconnecting said power from said drop cable.

10. The apparatus as in claim 5, wherein said allowing means comprises a data carrier bypass for allowing control data to be bypassed to said programmable program security device when said previously programmed address is determined be different from said tap address.

11. The apparatus as in claim 5, wherein said comparing means comprises a microprocessor and a capacitor for providing a temporary source of power to said microprocessor when said power is temporarily interrupted, and wherein said allowing means comprises a switch coupled to said microprocessor for interrupting said television signals when said power has been disconnected from said receiving means.

12. A tap apparatus for preventing unauthorized use of subscription television services, comprising:
   a first terminal for accepting a cable television signal from a trunk line;
   a second terminal for providing said cable television signal to a drop line;
   receiving means, coupled to said second terminal, for receiving an address and power from said drop line;
   storage means for storing a tap address;
   comparing means for comparing said address with said tap address;
   connecting means, responsive to said comparing means and to said power, for connecting said cable television signal to said second terminal when said power is supplied and when said comparing means determines that said address and said tap address are the same, and disconnecting said cable television signal from said second terminal otherwise.

13. The tap apparatus as in claim 12, further comprising carrier bypass means for connecting a passband of frequencies of said cable television signal to said second terminal when said connecting means has disconnected said cable television signal from said second terminal.

14. The tap apparatus as in claim 12, further comprising decoding means for decoding said address by detecting a presence and an absence of said power, and further comprising a temporary power source for driving said tap apparatus during periods of temporary power interruption caused by said absence of said power.

15. The tap apparatus as in claim 12, further comprising a second receiving means, coupled to said second terminal, for receiving a tap address request from said drop line, and tap address sending means, responsive to said second receiving means, for sending said tap address over said drop line when said tap address request is received.

16. The tap apparatus as in claim 15, wherein said tap address sending means sends said tap address by controlling said connecting means to alternately connect and disconnect said cable television signal from said second terminal.

17. A programmable program security device, comprising:
   a terminal coupled to a drop line supplying television signals received from a tap apparatus;
   requesting means, coupled to said terminal, for requesting a tap address from said tap apparatus via said drop cable;
   receiving means, coupled to said terminal and responsive to a signal level on said drop cable, for receiving said tap address from said tap apparatus;
   storage means for storing said tap address; and
   sending means, coupled to said terminal, for sending power and said tap address to said tap apparatus over said drop cable, wherein said tap address is sent by alternately connecting and disconnecting said power from said drop cable.

18. A device as in claim 17, wherein said receiving means comprises a microprocessor, and said storage means comprises a nonvolatile memory coupled to said microprocessor.

19. A device as in claim 18, further comprising a data receiver, coupled to said terminal, for receiving data from said drop cable, wherein said data receiver comprises an automatic gain control output.

20. A device as in claim 19, wherein said data receiver provides said gain control output to said microprocessor for decoding data modulated onto said drop cable by said tap apparatus.

* * * * *